US011023402B2

(12) United States Patent
Singer et al.

(10) Patent No.: US 11,023,402 B2
(45) Date of Patent: Jun. 1, 2021

(54) SWITCH PRUNING IN A SWITCH FABRIC BUS CHASSIS (71) Applicant: NATIONAL INSTRUMENTS CORPORATION, Austin, TX (US)

(72) Inventors: Eric L. Singer, Austin, TX (US); Jason W. Frels, Leander, TX (US); Jonathan W. Hearn, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 16/751,934

(22) Filed: Jan. 24, 2020

(65) Prior Publication Data

US 2021/0004342 A1    Jan. 7, 2021

Related U.S. Application Data (60) Provisional application No. 62/869,876, filed on Jul. 2, 2019.

(51) Int. Cl.
*G06F 13/40* (2006.01)
(52) U.S. Cl.
CPC ...... *G06F 13/4022* (2013.01); *G06F 13/4081* (2013.01); *G06F 2213/0026* (2013.01)
(58) Field of Classification Search
CPC ............. G06F 13/4022; G06F 13/4282; G06F 13/4027; G06F 13/4068; G06F 2213/0024; G06F 2213/0026; G06F 13/387; G06F 13/404; G06F 13/4081; G06F 2213/0052
USPC .... 710/316, 313, 110, 306, 9, 300, 311, 312
See application file for complete search history.

(56) References Cited

U.S. PATENT DOCUMENTS

| | | | |
|---|---|---|---|
| 6,356,548 B1 | 3/2002 | Nellenbach et al. | |
| 6,463,485 B1 | 10/2002 | Chui et al. | |
| 8,949,656 B1 * | 2/2015 | Ninan | G06F 11/2005 714/4.11 |
| 9,497,080 B1 * | 11/2016 | Friedman | H04L 41/0813 |

(Continued)

OTHER PUBLICATIONS

Anonymous, "Keysight PXIe Chassis Family User Guide, M9010A, M9018B, M9019A", Manual Part No. M9019-90003, Keysight Technologies, Inc., May 2018, p. 1-76, Third Edition.

(Continued)

*Primary Examiner* — Faisal M Zaman
(74) *Attorney, Agent, or Firm* — Kowert, Hood, Munyon, Rankin & Goetzel P.C.; Jeffrey C. Hood (57) ABSTRACT Bus enumeration of a switch fabric bus may be performed without assigning bus numbers to unused switch ports and/or corresponding slots to which the unused switch ports are routed. Accordingly, switches coupled to a switch fabric bus in a chassis may link-train with corresponding slots in the chassis in an attempt to establish active connections with devices coupled to the slots. Unused switch fabric bus lanes running from the switches to unused slots may be identified, and the unused switch ports corresponding to the unused switch fabric bus lanes may be disabled. During a subsequent bus enumeration procedure for the switch fabric bus, bus numbers may be allocated to the identified used switch ports (or corresponding used slots) but not to the identified unused switch ports (or corresponding unused slots). The link training, used/unused switch port identification, and bus enumeration may all be performed each time the chassis is reset.

20 Claims, 7 Drawing Sheets

(56) References Cited

U.S. PATENT DOCUMENTS

| | | |
|---|---|---|
| 9,524,181 B2 | 12/2016 | Ganesan et al. |
| 9,590,823 B2 | 3/2017 | Srinivasan et al. |
| 9,641,390 B2 | 5/2017 | Cudak et al. |
| 9,660,938 B2 | 5/2017 | Janakiraman et al. |
| 9,940,123 B1* | 4/2018 | Ayoub .................... G06F 8/656 |
| 10,277,422 B2 | 4/2019 | Chippa et al. |
| 10,523,500 B2 | 12/2019 | Li et al. |
| 10,666,553 B2 | 5/2020 | Perotin |
| 2005/0180410 A1 | 8/2005 | Pepenella |
| 2006/0230103 A1* | 10/2006 | Takamoto ........... H04L 67/1097 709/203 |
| 2006/0230217 A1 | 10/2006 | Moll |
| 2008/0056161 A1* | 3/2008 | Okita .................... H04L 41/00 370/254 |
| 2009/0070775 A1* | 3/2009 | Riley .................... H04L 49/65 719/311 |
| 2009/0228568 A1 | 9/2009 | Stewart et al. |
| 2010/0020809 A1* | 1/2010 | Jones .................... H04L 12/42 370/395.53 |
| 2010/0182936 A1* | 7/2010 | Valdevit ................. H04L 41/12 370/254 |
| 2011/0185103 A1* | 7/2011 | Evoy ................... G06F 13/4282 710/313 |
| 2012/0185634 A1* | 7/2012 | Shirai .................. G06F 13/385 710/316 |
| 2013/0124721 A1* | 5/2013 | Prasadam ........... H04L 43/0811 709/224 |
| 2013/0262937 A1* | 10/2013 | Sridharan ............... H04L 43/10 714/47.2 |
| 2014/0003444 A1* | 1/2014 | Nagatomo .......... H04L 41/0886 370/401 |
| 2014/0281078 A1 | 9/2014 | Biskup |
| 2015/0098362 A1* | 4/2015 | Merck .................. H04L 49/351 370/256 |
| 2016/0188511 A1* | 6/2016 | Muraoka ............... G06F 13/364 710/110 |
| 2018/0367870 A1* | 12/2018 | Shih ...................... H04L 41/085 |

OTHER PUBLICATIONS

Anonymous, "Keysight PXIe Chassis Family User Guide, M9010A, M9018B, M9019A", Manual Part No. M9019-90003, Keysight Technologies, Inc., May 2018, p. 77-152, Third Edition.

* cited by examiner

| PID | VID | Description |
|---|---|---|
| P1 | V1 | PCIe-PCI Bridge |
| P2 | V1 | SuperSpeed USB 3.0 xHCI Host Controller |
| P3 | V3 | 32-Lane, 8-Port, PCIe Switch |
| P4 | V2 | PXIe Chassis Control Device |
| P5 | V2 | DAQ Peripheral Card<br>PXI Chassis Timing and Sync Option |
| P6 | V3 | 64-Lane, 16-Port, PCIe Switch |
| P7 | V3 | 16-lane, 16-Port, PCIe Switch |
| P8 | V3 | 96-lane, 24-Port, PCIe Switch |

SWITCH PRUNING IN A SWITCH FABRIC BUS CHASSIS

PRIORITY CLAIM

This application claims benefit of priority of U.S. Provisional Patent Application Ser. No. 62/869,876 titled "Dynamic Switch Pruning in a Switch Fabric Bus Chassis", filed on Jul. 2, 2019, which is hereby incorporated by reference as though fully and completely set forth herein.

BACKGROUND OF THE INVENTION

Field of the Invention

This invention relates generally to bus interfaces, and, more particularly, to the design of automated switch pruning for switch fabric buses.

Description of the Related Art

Switched fabric or switching fabric typically refers to a network topology in which network nodes interconnect via one or more network switches (e.g. crossbar switches). A switched fabric network spreads network traffic across multiple physical links. Numerous high-speed serial data interconnect buses are implemented as switch fabric buses. The switched fabric structure can provide point-to-point connectivity between processor(s) and peripheral devices, but may lack certain features such as a message passing protocol. One example of a switch fabric bus is PCI Express (Peripheral Component Interconnect Express, also abbreviated as PCIe), which is a high-speed serial computer expansion bus standard that is a serial version of PCI. PCIe adheres to PCI's host/peripheral load/store DMA-based (direct memory access based) architecture on top of a serial physical and link layer.

PCIe offers numerous improvements over the older PCI, PCI-X, and AGP (Accelerated Graphics Port) bus standards. These improvements include higher maximum system bus throughput, lower I/O pin count and a smaller physical footprint, better performance-scaling for bus devices, more detailed error detection and reporting mechanism, and native hot-plug functionality. Conceptually, the PCIe bus is a high-speed serial interconnect bus using shared address/data lines. Accordingly, the PCIe bus differs from the older PCI bus in its bus topology. While PCI uses a shared parallel bus architecture, where the PCI host and all devices share a common set of address/data/control lines, the PCIe bus is based on a point-to-point topology, with separate serial links connecting every device to the root complex (or host). Because of this shared bus topology, access to the older PCI bus is arbitrated (in the case of multiple masters), and limited to one master at a time, in a single direction.

PCIe devices communicate via a logical connection referred to as an interconnect or a link, which provides a point-to-point communication channel between two PCIe ports, allowing both ports to send/receive PCI-requests (such as configuration read/write, I/O read/write, memory read/write) and interrupts. In a system that uses PCI or PCIe bus, in order for a PCI device to be addressable, the device must first be mapped into the I/O port address space or the memory-mapped address space of the system. The system's firmware/device drivers or the operating system typically program the Base Address Registers (referred to as BARs) to inform the device of its address mapping by writing configuration commands to the PCI controller.

The PCIe eXtensions for Instrumentation (PXI Express or PXIe) is one of several electronic instrumentation platforms in current use, and represents a modular instrumentation platform that leverages existing technology to deliver high performance and low cost modular instrumentation. PXIe is ideally suited for building electronic test-equipment and/or automation systems, and complements the industry standard PCIe with extra features to facilitate electronic testing and data acquisition. PXIe affords great flexibility in building test equipment and/or automation systems to exact requirements, often fitted with custom software for managing the entire system.

PXIe was conceived for measurement and automation applications that typically require high-performance and a rugged industrial form-factor. PXIe also allows for module selection from a large number of vendors, with the modules easily integrating into a single PXIe system. Overall, PXIe uses PC-based technology as part of an industry standard governed by the PXI Systems Alliance (PXISA), ensuring standards compliance and system interoperability. PXIe modules are available for a wide variety of test, measurement, and automation applications, from switching modules to high performance microwave vector signal generation and analysis instruments.

PXIe modules are typically designed to implement specific functions, such as analog signal capture, RF signal analysis, and/or waveform generation. PXIe modules that provide instrument functions usually plug into a PXIe chassis that may include its own controller running an industry standard Operating System (e.g. Windows, MacOS, and/or Linux), or a PCIe-to-PXIe bridge that provides a high-speed link to a desktop PC controller. Similarly, multiple PXIe racks may be linked together with PCIe bridges (or bridge cards) to build very large systems such as multiple source microwave signal generator test stands for complex applications.

As previously described, PCIe retains the communications and programming models of PCI but implements a serial point-to-point hardware topology. The PCI standard limits the number of buses to 256. Many BIOS (Basic Input/Output System) implementations further limit this number to 128, 64, or even 32 total bus numbers. For a PCI system, such as a Compact PCI or PXI (PCI eXtensions for Instrumentation) chassis, this does not present a significant problem as each PCI device behind the same PCI-PCI bridge shares a single bus number. However, PCIe uses a separate bus number for each downstream port of a switch. In a typical system, many PCI bus numbers are assigned (taken up) by onboard peripherals such as network cards and hard drives. As an example, a typical computer system uses approximately 10 bus numbers. A typical 18-slot expansion chassis uses approximately 25 bus numbers.

In order to expand a PCIe system, one or more set of expansion ports may be attached together. For a multi-chassis PXIe system, a Multisystem eXtension Interface (MXI) connection is used, which provides the host with direct control over multiple PXIe backplanes and connected cards. These MXI expansion ports are implemented using PCIe switch technology and use additional bus numbers. For example, some PCIe MXI configurations may use four bus numbers in the first chassis and five bus numbers in all subsequent chassis. Due to the above configuration considerations, attaching an expanded PCIe or PXIe system to a computer that is PCIe bus limited may become problematic. The respective BIOS's of many desktop PC manufacturers limit the maximum number of PCIe bus numbers to 64 by default. Some of them allow the user to change this default, but many do not. With a 64 bus number limit, it is generally not possible to connect two expansion chassis.

Other corresponding issues related to the prior art will become apparent to one skilled in the art after comparing such prior art with the present invention as described herein.

SUMMARY OF THE INVENTION

Bus enumeration of a switch fabric bus, e.g. a PCIe bus or PXIe bus, may be performed without assigning bus numbers to switch ports coupled to switching lanes that are routed to unused slots, e.g. unused device slots in a chassis. To put it another way, any port of a switch routed to an unused slot (e.g. device slot in a chassis) may not be assigned a bus number. In this context, the word "slot" is used to refer to a connecting element or connector to which a device may be attached/connected/coupled. Thus, when reference is made to a slot in a chassis for example, the slot in the chassis is understood to include a connecting element or connector to which a device or devices may be attached or connected or coupled. Accordingly, in some embodiments, a chassis may include a switch fabric bus, e.g. a PCIe bus or PXIe bus, switches having ports coupled to the switch fabric bus, and a control unit (which may be a control circuit) for selectively disabling those ports of the switches that couple to switching lanes (or switch fabric lanes) routed to unused (device) slots in the chassis. Switches may support disabling the switch ports dynamically on demand and dynamically at reset. The switches may also support disabling the switch ports at reset in response to initialization parameters, e.g. parameters preconfigured in a memory device such as an EEPROM or flash device. Therefore, once the switches (or switch ports) have performed a link training procedure with corresponding slots, the control unit may identify switch ports that are coupled to switch fabric bus lanes routed to unused slots, and dynamically disable the identified switch ports, or modify corresponding initialization parameters to ensure that the identified switch ports are disabled on a subsequent reset. In response to the identified switch ports being disabled, when the bus is enumerated, bus numbers are not allocated to the identified switch ports, while bus numbers are allocated to switch ports coupled to switch fabric lanes that are routed to used slots. Link training the switches (or switch ports) with corresponding slots includes the switches attempting to establish an active connection between the switch ports and corresponding slots via respective connective paths or switching lanes in the switch fabric bus. For example, each switch may have two or more ports, and link training the switch with corresponding slots includes establishing (e.g. by the switch) an active connection between each used slot and a corresponding port of the switch, via a connective path or switching lane in the switch fabric bus. A switch port is considered not to have link trained with a corresponding slot when an active connection is not established or cannot be established between the switch port and the corresponding slot, for example because the slot is unused.

The control unit may query the switches to obtain information indicative of the unused slots, and may use the obtained information to disable the switch ports corresponding to switch fabric lanes routed to the unused slots. To put it another way, the control unit may query the switches to determine which, if any, of the switch ports did not successfully link-train with a corresponding slot (or device attached to the slot) and may disable those switch ports, or modify corresponding initialization parameters to ensure that the identified switch ports are disabled on a subsequent reset. The procedure may be performed each time the chassis is reset, and prior to enumerating the bus. The control unit may be implemented in a variety of different ways. In some embodiments, it may be a firmware implementation, with the firmware program executed when the chassis is reset. In some embodiments, the control unit may be implemented as a device driver running as part of a host operating system. In this manner, not all slot numbers in a chassis have to have a corresponding bus number, and bus numbers may be allocated only to those slots that have valid devices connected or attached.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Figure 1:
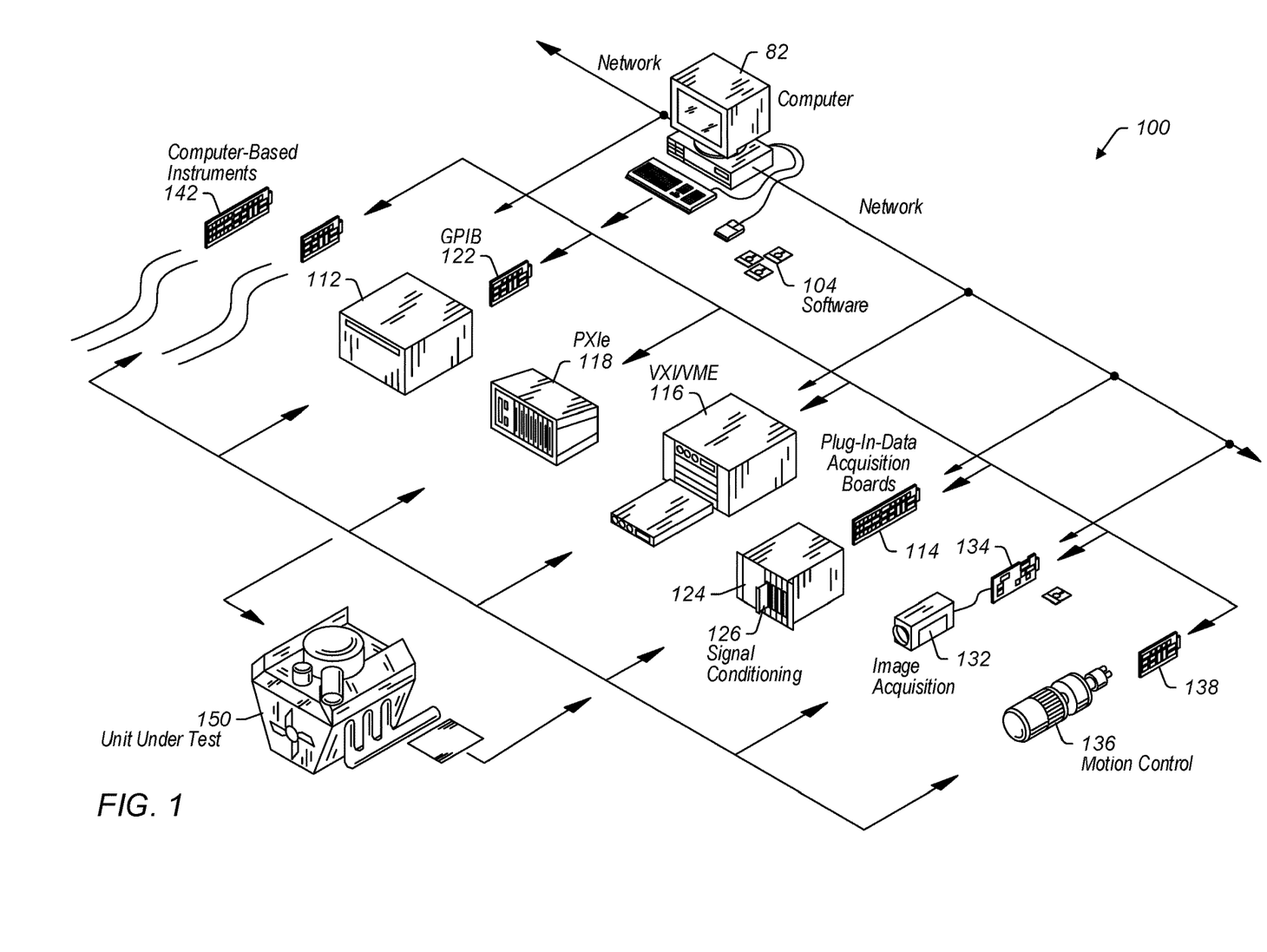
FIG. 1 shows an exemplary instrumentation control system with instruments networked together according to some embodiments.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU (Central Processing Unit), a display screen, memory, and one or more input devices such as a mouse or keyboard as shown. Computer 82 may operate with one or more instruments to analyze, measure, or control a unit under test (UUT) or process 150. The one or more instruments may include a GPIB (General Purpose Interface Bus) instrument 112 and associated GPIB interface card 122, a data acquisition board 114 inserted into or otherwise coupled with chassis 124 with associated signal conditioning circuitry 126, a VXI (VERSAmodule Eurocard [VME] eXtensions for Instrumentation) instrument 116, a PXIe (PCIe eXtensions for Instrumentation) instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the UUT or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
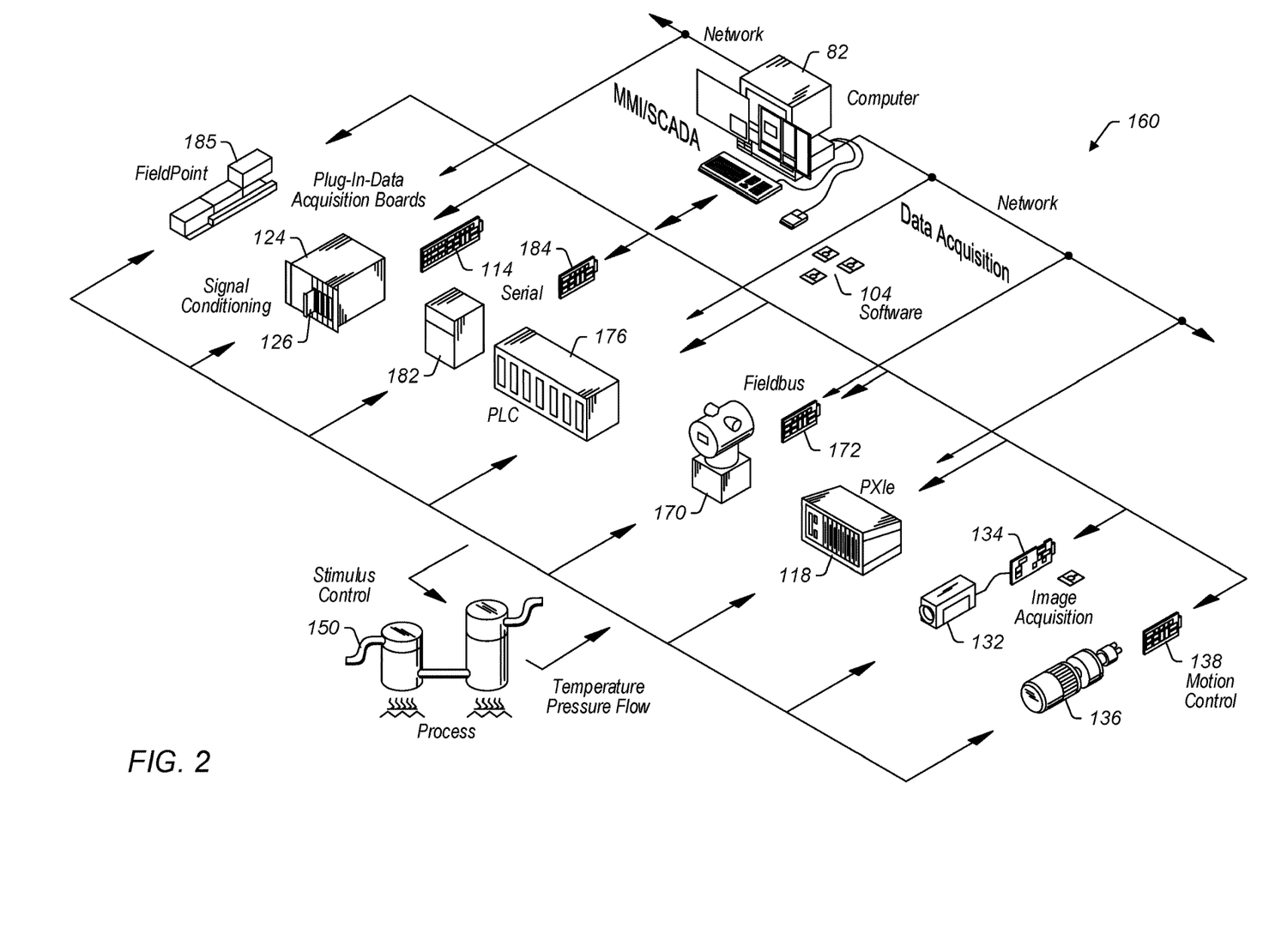
FIG. 2 shows an exemplary industrial automation system with instruments networked together according to some embodiments.

FIG. 2 illustrates an exemplary industrial automation system 160 that may be configured according to embodiments of the present invention. Industrial automation system 160 may be similar to instrumentation or test and measurement system 100 shown in FIG. 1. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXIe instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection, which may facilitate running a high-level synchronization protocol between the computer system and the coupled instruments/devices.

Bus Enumeration

As seen in FIG. 1 and FIG. 2, system 100 and/or system 160 may include one or more chassis or plug-in boards that use a switch fabric bus, e.g. a PCIe or PXIe bus to couple one or more of a variety of different devices or functions which may interact with the host or host computer. Considering PCIe as a switch fabric bus, PCIe operates according to a point-to-point packet protocol and appears in the system as a bus that couples together PCIe devices. Transactions that occur on the PCIe topology are expected to work out the same as if they had been executed on a conventional PCI bus. Accordingly, there is oftentimes a need to transparently route the packets representing read and write transactions to the proper, i.e. intended, device. Operations are expected to be initiated from/by a bus master, and packets are expected to arrive at their proper destinations. There are a number of packet types and a number of routing mechanisms in PCIe.

When programming for a PCIe bus, the SW (software) is typically configured as if a PCI bus were in use. Based on an address range, the PCIe topology is expected to determine which device a given packet is intended for. Therefore, an address routing protocol is implemented by the various switches in the topology. Responses to reads are not address based, rather they are routed back to the originator. One of the routing mechanisms in PCIe is BDF (bus device function) routing. BDF is representative of the respective addresses of the devices in the PCIe system. Read responses are routed back to the respective originators, using the BDF, and the originators place their respective BDFs in the packet.

As previously mentioned, the PCI standard limits the number of buses to a given number, specifically 256. Many BIOS implementations further limit this number to 128, 64, or even 32 total bus numbers. This does not present a problem for a PCI system, such as a Compact PCI or PXI chassis, because each PCI device behind the same PCI-PCI bridge shares a single bus number. PCIe/PXIe on the other hand uses a separate bus number for each downstream port of a switch, and in a typical system many PCI bus numbers are assigned to onboard peripherals such as network cards and hard drives. In order to expand a PCIe/PXIe system, one or more set of expansion ports may be attached together, with typical sets of expansion ports in a Compact PCIe or PXIe system. For a multi-chassis PXIe system, an MXI (Multisystem eXtension Interface) connection is typically used. For example, some PCIe MXI configurations use four bus numbers in the first chassis and five bus numbers in all subsequent chassis. Attaching an expanded PCIe/PXIe system to a computer that is PCIe-bus/PXIe-bus limited may become problematic. The respective BIOS of many desktop PC manufacturers limits the maximum number of PCIe/PXIe bus numbers to 64 by default, and while this default is adjustable in some systems, many systems do not provide such capabilities. With a 64 bus number limit, it is typically not possible to connect two expansion chassis.

If the expansion chassis is designed to support PCIe/PXIe peripherals that are wider than a typical slot, for example 4-slot Vector Signal Transceiver cards, even a specified low number of modules, e.g. five (5) modules in a single system may not be enumerated despite the modules only requiring five bus numbers. This is because for a two 18-slot chassis system, all 34 peripheral slots are allocated a bus number. If this limitation were to be removed and only the slots that were required were allocated bus numbers, 29 bus numbers could be saved, and a typical desktop PC would be able to enumerate correctly all modules. In other words, generally considering similar switched fabric buses, when all peripheral slots in a switched fabric bus chassis are allocated bus numbers, even a low number of modules in the chassis may not enumerate properly.

There are many other examples of situations in which the bus numbers on unused slots contribute to unsuccessful system operation. In order to overcome this limitation, various embodiments of an improved system and method disclosed herein may operate to detect which slots are used and enumerate the bus accordingly. The detection may take place between the time of a bus reset (e.g. a PCIe/PXIe reset) and when the modules (inserted into and/or otherwise connected or coupled to the bus, e.g. in a chassis, such as chassis 124 in FIGS. 1 and 2) are enumerated, e.g. enumerated by the BIOS. Detection may also take place after modules have been enumerated. For slots that are not currently in use, the system (e.g. chassis 124) may dynamically disable the corresponding PCIe switch ports to prevent the enumerator from allocating bus numbers to those switch ports. The system may disable the corresponding switch ports dynamically in coordination with the enumerator to facilitate an orderly and immediate re-enumeration. Alternately, the system may disable the corresponding switch ports through the use of corresponding initialization parameters, in which case enumeration after a subsequent reset results in the corresponding switch ports not being enabled, based at least on the values of those corresponding initialization parameters. It should be noted, as also previously described, that as used herein, the word "slot" ultimately refers to a connecting element or connector to which a device may be attached/connected/coupled. Thus, when reference is made to a slot, for example a slot in a chassis, the slot is understood to include a connecting element or connector to which a device or devices may be attached or connected or coupled.

As previously mentioned, some present-day systems offer a mechanism for configuring a switch fabric bus (e.g. PCIe/PXIe) that allows for the creation of a custom configuration for the system controller slot (typically through an EEPROM image). However, the reconfiguration does not remove the bus numbers corresponding to unused slots. Various versions of such configuration mechanisms for switch fabric buses are equally focused on changing the switch fabric bus (e.g. PCIe/PXIe) lane configurations without making provisions for eliminating unused bus numbers.

The limitations described above may be overcome by implementing a configuration mechanism for switch fabric buses that eliminates bus assignment to switch ports corresponding to unused slots. In some embodiments, additional logic—for example circuitry and/or additional instructions to firmware which are operating/running within the chassis housing the switch fabric bus slots and switches—may be configured to implement dynamic bus configuration, whereby unused slots, or switch ports corresponding to unused slots do not get a bus number assigned. It should be noted that while various embodiments disclosed herein specifically refer to a PCIe and/or PXIe bus, the mechanism and principles disclosed herein may be equally applied to other switch fabric buses using slot/port/switch bus assignments. Furthermore, slots (or device slots) may be considered unused for a variety of reasons. For example, a slot or switch port may be unused because it is unoccupied, that is, it has no devices attached. Another example of an unused switch port may be a switch port that is connected to a specific component that may be considered to be of no practical use. For example, the switch port may be connected to a PCIe-to-PCI bridge within the chassis, with the bridge connecting to PCI slots. If all those PCI slots are unoccupied, the switch may be disabled even when a successful link has been established between the switch and the bridge, as the bridge is of no practical use because of its connection to unoccupied slots. A slot may also be considered unused because it has an unrecognized device attached. One example of an unrecognized device may be a device with a broken switch fabric bus link that cannot link-train with a switch, e.g. it cannot establish an active, valid connection with a corresponding port of the switch. This may be due to a hardware issue such as bad pins and/or bad wiring, or a power issue, or some other unknown issue. Another example of an unrecognized device may be a device that is not using the expected switch fabric bus signaling, for example a legacy PCI device in case of a PCIe/PXIe bus. Overall, unrecognized devices are devices which cannot successfully link-train with a corresponding port of a switch for any reason. Generally, whenever a slot is considered unused, the unused slot, or a switch port connected to a switching lane routed to the unused slot may not be assigned a bus number.

In some embodiments, in a switch fabric bus system, for example in a chassis-based switch fabric bus system, after a master reset signal, e.g. a PCIe/PXIe Reset (PERST) signal has been deasserted, time may be provided for the switch fabric switch(es), e.g. PCIe switch(es) to link-train with the slots within the chassis. The switches may attempt to automatically link-train with the (device) slots upon the chassis exiting reset or exiting the reset state. As previously mentioned, during link training, attempts may be made to establish an active, valid connection between switch ports and corresponding slots via respective switching lanes or switch fabric bus lanes in the switch fabric bus, for each slot.

Following the link training procedure, the switch(es) may be queried to ascertain which switch ports have successfully link trained with corresponding slots or valid receivers, and which switch ports have not. That is, the switches may be queried to determine or detect which switch ports are routed to used slots and which switch ports are routed to unused slots via respective corresponding switching lanes or switch fabric lanes. Upon detecting that a switch port has not successfully link trained with a corresponding slot to which the switch port is routed via a corresponding switching lane or switch fabric bus lane, the slot may be designated an unused slot, and the switch port may be disabled on the switch so an upstream bus enumerator will not allocate a bus number to the unused slot or switch port. That is, unused switch ports are disabled at their corresponding switches, which eventually results in the bus enumerator not allocating bus numbers to the disabled switch ports, and consequently to the unused slots.

The above procedure may be performed with each subsequent reset of the system. Generally, each time a designated reset signal is asserted then deasserted, or each time the system/chassis configuration changes, for example when modules are added or removed, the new configuration may be dynamically applied on the subsequent (next) powering up of the system/chassis, as the switch fabric bus network (tree) is dynamically "pruned". In some embodiments, the above procedure may be performed in response to a user-initiated command, where results of a scan for unused slots are used to modify switch initialization parameters, and ports connected to unused slots may then be disabled on subsequent resets, based on the values of the switch initialization parameters. In such embodiments, the disabling of switches in the switch fabric bus network may be identical across multiple resets, unless a user initiates a new scan for unused slots. That is, the same switches may be disabled during each reset, unless a new scan for unused slots has been initiated.

Figure 3:
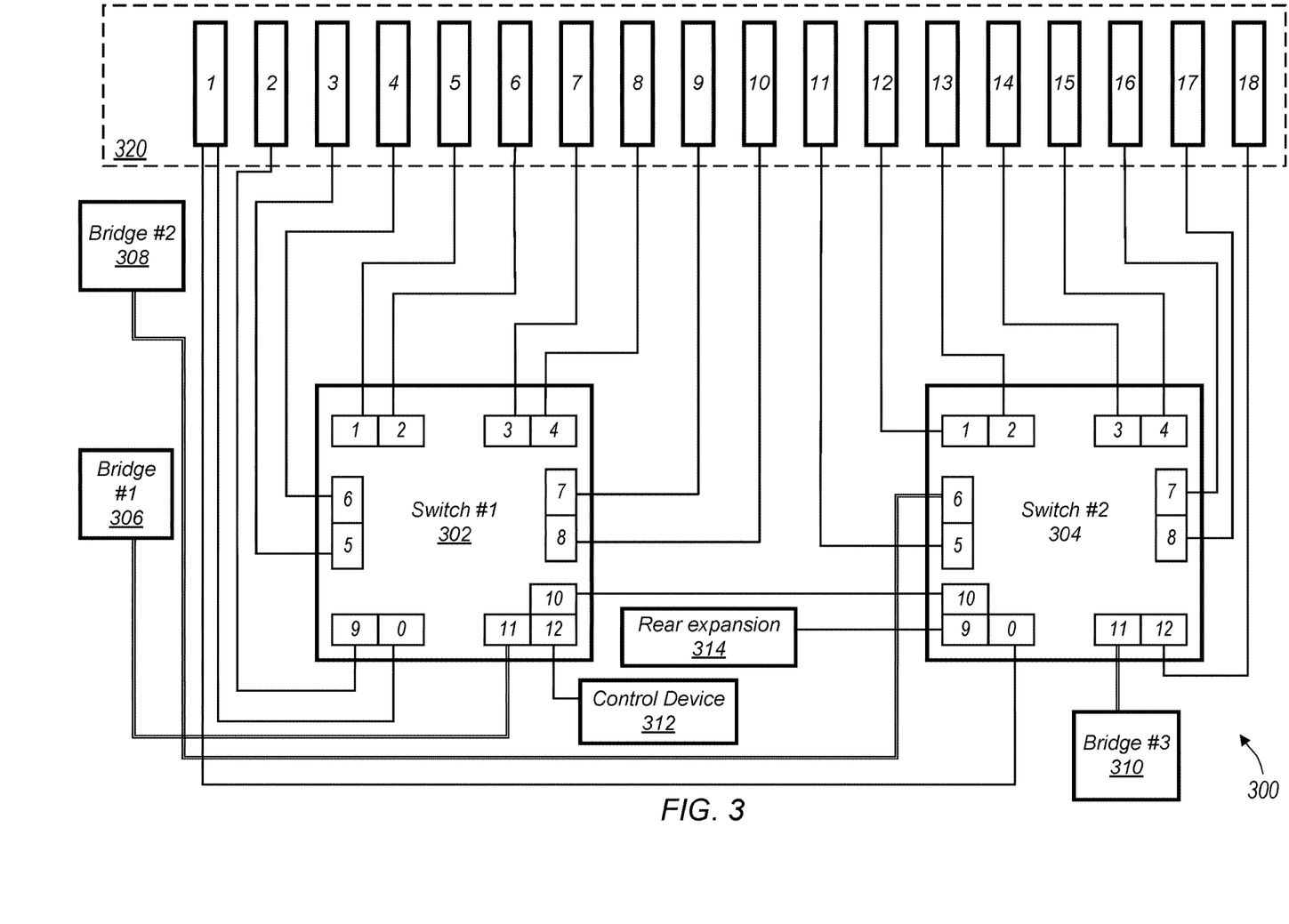
FIG. 3 shows a partial block diagram of an exemplary switch fabric bus system, according to some embodiments.
Figure 4:
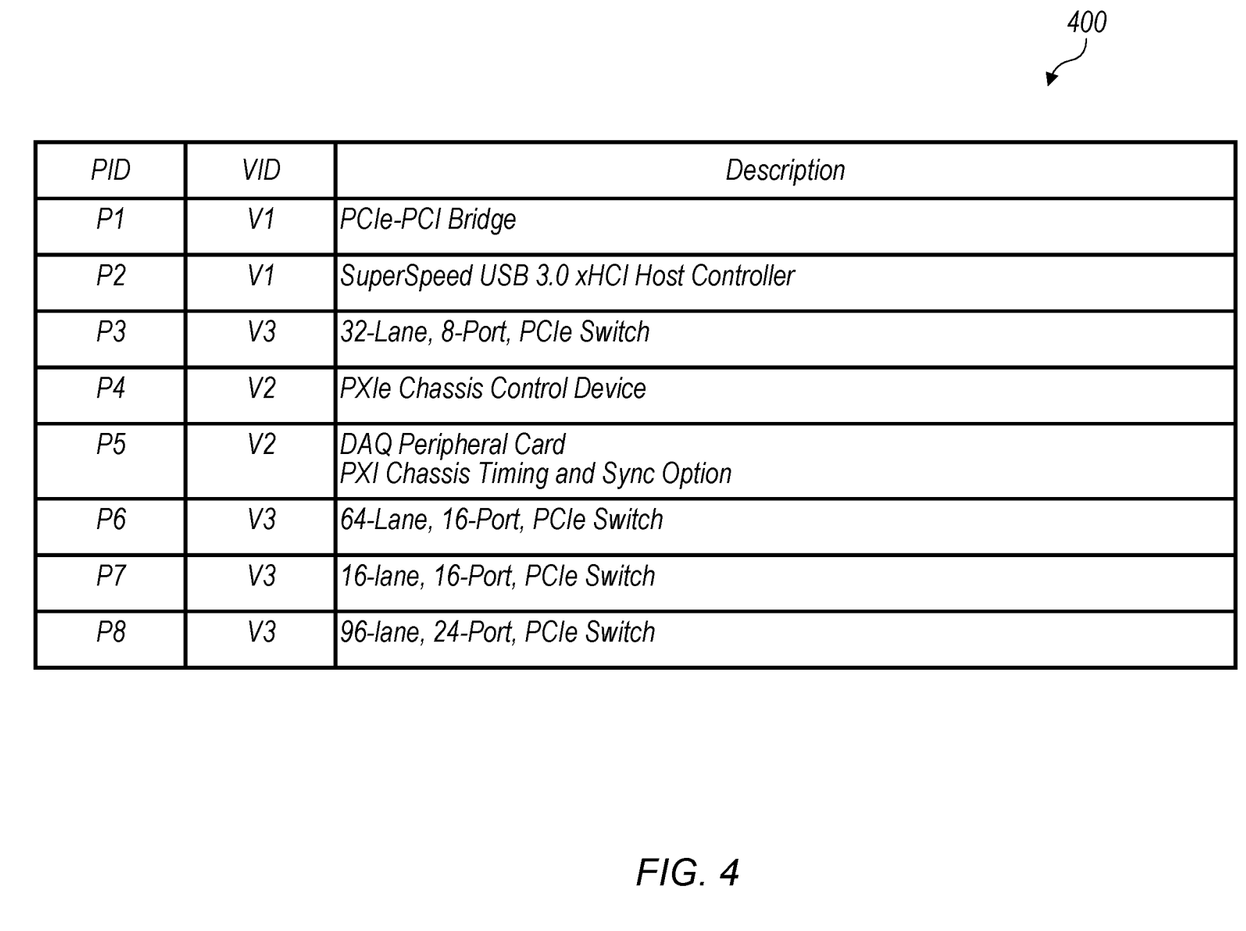
FIG. 4 shows an exemplary table that lists various components that may be part of a switch fabric bus system, according to some embodiments.
Figure 5:
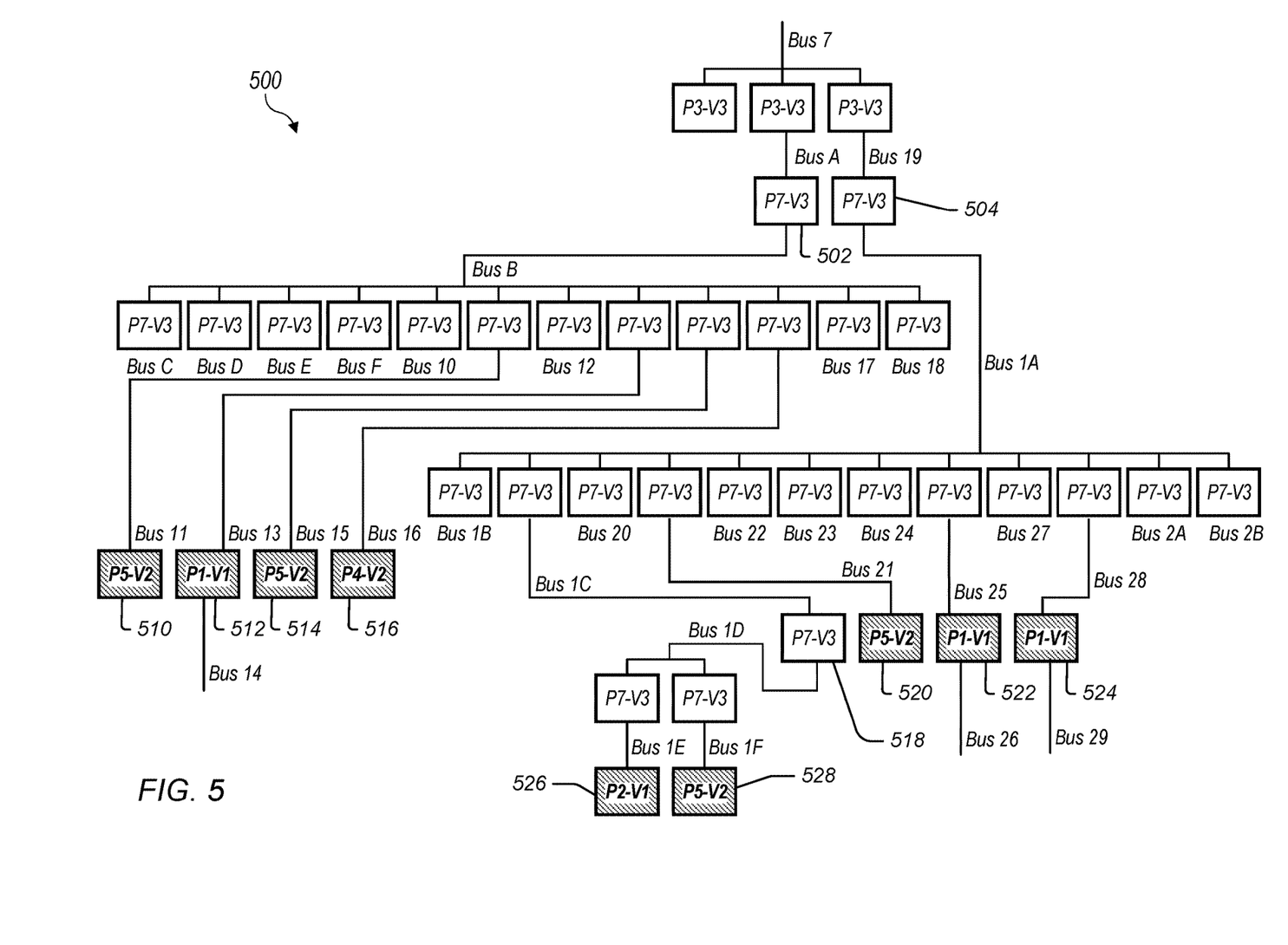
FIG. 5 shows a diagram illustrating the switch fabric bus structure corresponding to an exemplary switch fabric bus system, with switch pruning disabled, according to some embodiments.
Figure 6:
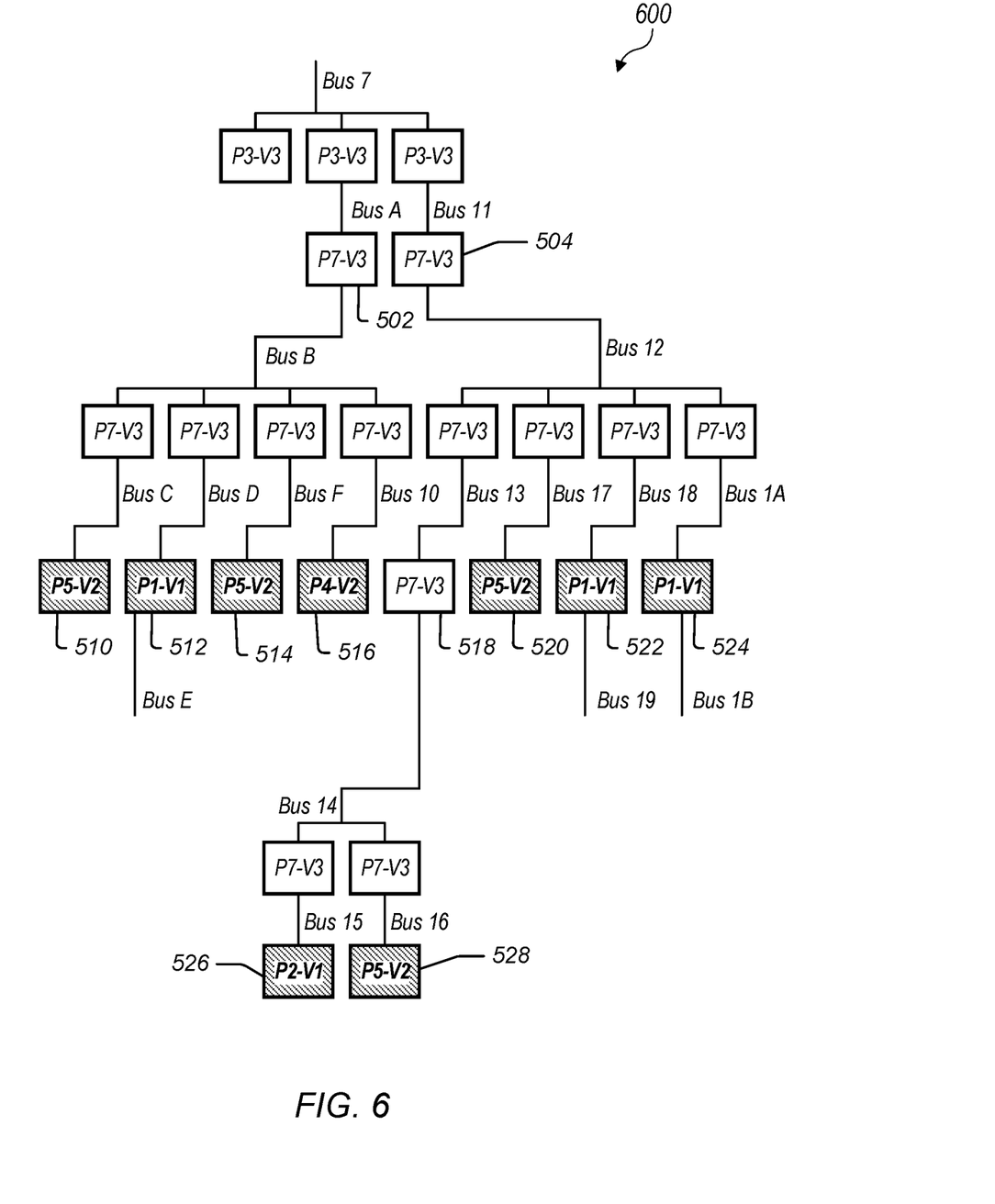
FIG. 6 shows a diagram illustrating the switch fabric bus structure corresponding to the exemplary switch fabric bus system, with switch pruning enabled, according to some embodiments.

An exemplary implementation of a switch fabric bus system in a chassis according to the principles described above is illustrated in FIGS. 3-6. The partial block diagram of FIG. 3 illustrates an exemplary switch fabric bus system, while the respective diagrams in FIGS. 5 and 6 show the switch fabric bus structure corresponding to an exemplary switch fabric bus system in which a host PC is connecting to a single switch fabric bus chassis, e.g. to a single PXIe chassis. Table 400 in FIG. 4 includes PID (Product IDentification) numbers and VID (Vendor Identification) numbers and corresponding descriptions for various exemplary components, some or all of which may be included in a switch fabric bus system. It should be noted that the PID numbers and VID numbers listed in table 400 represent ersatz values provided for illustrative purposes. It should further be noted that the components described in table 400 are exemplary and are provided for the purposes of illustration and ease of understanding, for example for inclusion and use in the switch fabric bus system illustrated in FIGS. 3, and 5-6. One of ordinary skill in the art will appreciate that various embodiments of the principles of switch fabric pruning described herein are not restricted to the examples provided in FIGS. 3-6, and may be applied to any switch fabric bus system/chassis that uses slot/port address assignments as those described herein.

FIG. 3 shows a partial block diagram of an exemplary switch fabric bus system 300. The exemplary system 300 is representative of a switch fabric bus system chassis, for example a PCIe or PXIe system chassis, and includes eighteen (18) slots 320 numbered 1 through 18. System 300 also includes two switches 302 and 304, which may be PCIe switches. Control device 312 may be a processing unit capable of performing various processing tasks for system 300, for example it may dynamically perform part or all of the functionality of switch pruning for switches 302 and 304. Rear expansion module 314 may provide additional expansion capability for the chassis. Port 0 of switch 302 and port 0 of switch 304 are both routed to slot 1, which may couple to a host or host system interfacing with switch fabric bus system 300. Each switch may support a specific number of switching lanes, e.g. bus lanes in the switch fabric bus, routing the switches to intended devices, slots, or any desired component. The switches 302 and 304 shown in the exemplary system 300 are 16-lane switches which may be set up in any number of different combinations of ports and switching lanes. For example, the switches may be set up to operate with sixteen 1-lane ports or four 4-lane ports or any other combination supporting up to sixteen total lanes. Switches 302 and 304 are set up to operate with one 4-lane port and twelve 1-lane ports. Accordingly, switches 302 and 304 are shown as having thirteen (13) ports numbered 0 through 12, with port 0 set up as the 4-lane port.

As indicated in FIG. 3, a large subset of the ports are connected to corresponding switching lanes or switch fabric bus lanes routed to corresponding slots. For example, port 3 of switch 302 is routed to slot 7, port 1 of switch 304 is routed to slot 12, and so on and so forth. In addition, port 11 of switch 302 is routed to bridge 306, port 6 of switch 304 is routed to bridge 308, port 11 of switch 304 is routed to bridge 310, port 12 of switch 302 is routed to a control device 312, and port 9 of switch 304 is routed to a rear expansion module 314. Bridges 306, 308, and 310 may be PCIe-to-PCI bridges providing additional options for connecting devices to the chassis. More specifically, in some embodiments, each slot 320 may include two electrical connections, one to either switch 302 or switch 304 (depending on which switch is routed to the slot), and the other one to a PCIe-to-PCI bridge. In system 300, bridge 306 may correspond to slots 2-7, bridge 308 may correspond to slots 8-13, and bridge 306 may correspond to slots 14-18. Thus, a device that plugs into or attaches/couples to a slot may connect to either one of these connections. For example, a device plugged into slot 3 may electrically connect to either port 5 of switch 302 or bridge 306 depending on the type and/or configuration of the device. For example, if the device is a PXIe device, it may electrically connect to port 5 of switch 302, whereas if the device is a legacy PXI device, it may electrically connect to bridge 306. As will be further disclosed below, when a device in a slot electrically connects to one of bridges 306, 308 or 310, instead of a corresponding port of a corresponding switch routed to the slot, the slot may be considered an unused slot for the purpose of bus enumeration. In such a case the slot is considered unused because the device does not require a bus address number as it is not using a direct switch fabric connection, but it still resides in the slot and operates correctly via the required bus signaling (in this case PCI signaling) through the bridge (in this case a PCIe-to-PCI bridge) to which it is electrically connected. In this manner, legacy PXI devices in a PXIe chassis, for example, do not consume bus numbers when it is unnecessary to assign them a bus number.

In system 300, some of slots 320 may be unused. For example, while valid devices may be attached/coupled to a number of slots, some slots may be unoccupied or may have unrecognized or legacy devices attached/coupled, as previously discussed. Upon exiting a system reset, switch 302 and switch 304 may perform a link training procedure to link-train with slots 320, or devices attached to slots 320. Accordingly, each switch port may link-train with a corresponding slot to which the port is routed, when that slot has a valid device attached. As previously noted, a "valid device" as used herein simply refers to a device to which a corresponding bus number should be assigned. For example, an endpoint device may be attached to slot 3, and port 5 of switch 302 may successfully link-train with slot 3 or the endpoint device attached/coupled to slot 3, thereby establishing an active (electrical) connection with the endpoint device attached/coupled to slot 3. Once the link training procedure has been completed, control device 312 may query switches 302 and 304 (for example via a secondary bus, not shown, which may couple control device 312 to switches 302 and 304) and may identify switch ports that are coupled to switch fabric bus lanes routed to unused slots. So, for example, if slots 4, 8, 12, and 16 are unused, control device 312 may identify ports 4 and 6 of switch 302 as unused ports, and may identify ports 1 and 7 of switch 304 as unused ports. Control device 312 may subsequently disable ports 4 and 6 of switch 302 and ports 1 and 7 of switch 304. Consequently, when the switch fabric bus of system 300 is enumerated, for example by the host coupled to slot 1, those ports, and the slots corresponding to those ports, may not be assigned a bus number, while bus numbers may be assigned to all other ports/slots.

FIG. 5 provides an illustration of the switch fabric bus structure corresponding to the exemplary switch fabric bus system illustrated in FIG. 3, without switch pruning enabled. That is, as illustrated in FIG. 5, all switch ports, even those routed to an unused slot are allocated/assigned a bus number. To put it another way, switch ports coupled to connecting lanes that did not successfully link-train with a valid receiver/device are still allocated a bus number. In contrast, as shown in FIG. 6, the switch fabric bus structure includes bus numbers allocated only to switch ports routed to used slots, that is, to valid endpoint devices.

FIG. 5 shows what may be considered a typical switch fabric bus chassis, exemplified in system 500 as a PXIe chassis that includes two switches 502 and 504. For the purposes of discussion, of all the illustrated elements in system 500 only the components of interest in demonstrating operation of the pruning mechanism described herein will be considered. In addition, the bus numbers are indicated by 2-digit hexadecimal numbers (with a leading "0" not shown). The first switch (502) is connected to Bus A, and creates Bus B for all of its downstream connections. That is, switch 502, connecting to Bus A, creates Bus B to connect up to a specified number of downstream devices (in this case twelve devices), to Bus A (via switch 502). The twelve instances of "P7-V3" (which is a PCIe switch) spanning from bus B underneath switch 502 represent the ports of switch 502 and their corresponding switching lanes from switch 502 to the potential devices, as switch 502 may itself be considered to operate as a PCIe-PCIe bridge. As illustrated in system 500, there are four (4) actual devices attached to switch 502, devices 510, 512, 514, and 516. However, because switch pruning is turned off in system 500, the first five ports of switch 502 from left to right are all allocated bus numbers, in this case bus numbers C, D, E, F, and 10 respectively. Bus number 11 is allocated to endpoint device 510. Another unused port to the right of the port coupled to device 510 is allocated bus number 12. The next device (512) to the right is assigned bus number 13, and because device 512 is indicated to be a PCIe-PCI bridge (in reference to table 400) as opposed to an endpoint device, it is also allocated bus number 14 as shown. Endpoint device 514 is allocated bus number 15, and endpoint device 516 is allocated bus number 16. The two remaining ports of switch 502 without attached devices are allocated bus number 17 and bus number 18, respectively. Once the enumeration has been completed for switch 502, the enumeration may continue with bus number 19 which connects to a second switch 504 (a PCIe-PCIe switch in system 500) in the chassis.

The bus numbering associated with switch 504 is similar to that associated with switch 502. Thus, the second switch (504) is connected to Bus 19, and creates Bus 1A for all of its downstream connections. That is, switch 504, connecting to Bus 19, creates Bus 1A to connect up to a specified number of downstream devices (in this case twelve devices), to Bus 19 (via switch 504). Similar to switch 502, the twelve instances of "P7-V3" spanning from bus 1A underneath switch 504 represent the ports of switch 504 to the potential devices, as switch 504 operates as a PCIe-PCIe bridge. As illustrated in system 500, there are four (4) actual devices attached to switch 502, devices 518, 520, 522, and 524. Again, because in system 500 switch pruning is turned off, even the ports of switch 504 without attached devices are allocated bus numbers, in this case bus numbers 1B, 20, 22, 23, 24, 27, 2A, and 2B respectively. Bus number 1C is allocated to device 518, which itself is a switch and is therefore allocated bus numbers 1D, and bus number 1E corresponding to endpoint device 526 and bus number 1F corresponding to endpoint device 528. It should be noted that while device 518 is marked as the same model (P7-V3) as devices 502 and 504, in the example shown many of the ports on device 518 are statically disabled, indicating only two downstream ports instead of the 12 downstream ports indicated for devices 502 and 504. The next endpoint device (520) is assigned bus number 21. Devices 522 and 524 are indicated to be PCIe-PCI bridges (in reference to table 400) as opposed to an endpoint device, and they are therefore allocated bus numbers 25 and 26, and bus numbers 28 and 29, respectively, as shown.

In contrast to system 500, FIG. 6 shows a diagram illustrating the switch fabric bus structure corresponding to the same switch fabric bus system, but with the switch pruning feature enabled. Thus, as shown in system 600, the same switch 502 is connected to bus A, and creates bus B for the downstream bridges. However, in system 600, switch ports of switch 502 (e.g. PCIe-PCIe bridges) without any attached devices (whether endpoint devices or other switches/bridges) are not allocated bus numbers. In other words, there are no empty PCIe-PCIe bridges that consume bus numbers, so the first endpoint device 510 is allocated bus number C, the PCIe-PCI bridge 512 is allocated bus number D (with bus number E allocated underneath it), followed by endpoint devices 514 and 516 which are allocated bus numbers F and 10, respectively. Bus numbers for the ports of second switch (504) may allocated similarly, but now, instead of starting with bus number 19 (which was the case in system 500), the bus numbering may start at bus number 11 instead, due to the lack of unnecessary bus number allocations. Accordingly, bus number 13 is allocated to device 518, which, being a switch, is therefore also allocated bus number 14, and bus number 15 corresponding to endpoint device 526 and bus number 16 corresponding to endpoint device 528. The next endpoint device (520) is assigned bus number 17. Devices 522 and 524 are allocated bus numbers 18 and 19, and bus numbers 1A and 1B, respectively, as shown.

Figure 7:
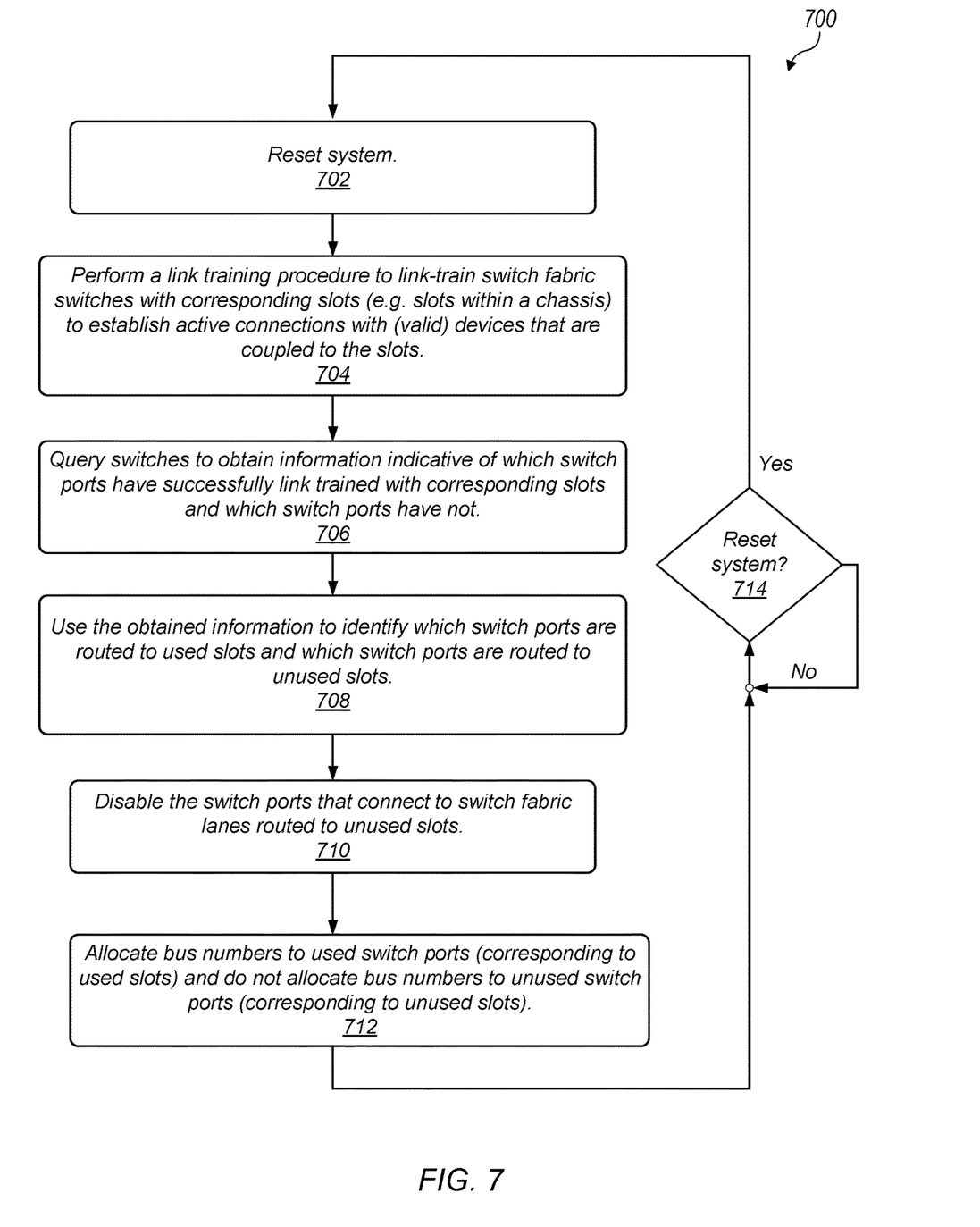
FIG. 7 shows a block diagram of an exemplary method for assigning bus numbers in a switch fabric bus system, according to some embodiments.

FIG. 7 shows a block diagram of an exemplary method 700 for assigning bus numbers in a switch fabric bus system, according to some embodiments. Specifically, flow diagram 700 illustrates how switch pruning may be performed, facilitating the assignment of bus numbers to used ports/slots without assigning bus numbers to unused ports/slots. Once the system has been reset (702), a link training procedure may be performed to link-train the switch fabric switches with corresponding slots, e.g. slots in a chassis (704). For example, in case of a PCIe bus, PCIe switch(es) may attempt to link-train with slots (e.g. within a chassis) into which various devices, including bridges, switches, and/or endpoint devices, just to name a few, may be inserted/coupled, to establish active connections with (valid) devices. Following the link training procedure, the switches may be queried to obtain information indicative of which switch ports have successfully link trained with corresponding slots and which switch ports have not (706). For example, in case of a PCIe bus, the switches may be queried to ascertain which PCIe switch ports and corresponding PCIe bus lanes have successfully link trained with a device/receiver and which have not. It should be noted that there may be one or more switches present, and the term "switches" in this context is used to denote one or more switches. Following the query, the obtained information may be used to determine which switch ports are routed to used slots and which switch ports are routed to unused slots (708). For example, in case of a PCIe bus, the obtained information may be used to determine which switch ports may be considered unused (e.g. corresponding to unused slots) based on which switch ports have not successfully link trained with a device/receiver. Consequently, the switch ports coupled to switching lanes, or switch fabric bus lanes that are routed to unused slots may be disabled in the switch, resulting in an upstream bus enumerator not allocating a bus number to the unused switch ports or slots (710). The bus may then be enumerated, with bus numbers allocated to the used ports corresponding to used slots, and bus numbers not allocated to the unused ports corresponding to the unused slots (712). This procedure may be performed each time the system is reset, that is, when the "Yes" branch is taken at 714.

In some embodiments, 702 and 712 may be performed by the host system, 704 may be performed by the switches themselves, and 706, 708, and 710 may be performed by a control circuit or control unit which may be implemented within the chassis. For example, the control circuit/unit may include a processor executing firmware instructions, but alternate embodiments may implement the control unit in a number of different ways, for example as programmable field gate array or an application specific circuit or any combination of the above, and so on and so forth. In some embodiments, the control unit may communicate with the switches over a secondary bus, e.g. over an $I^2C$ bus. In some embodiments, the host system may be embedded in the chassis or it may connect to the chassis, for example via an MXI. In some embodiments, for example when the host system is embedded in the chassis (or in the switch fabric bus system), 702, 706, 708, 710, and 712 may be executed by the host system, for example a processor of the host system executing firmware instructions.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A method for allocating bus numbers in a switch fabric bus system, the method comprising:
   (a) performing a link training procedure to link-train one or more switches with a plurality of slots, wherein the one or more switches include a plurality of switch ports, and wherein the plurality of slots are configured to couple devices to a switch fabric bus;
   (b) identifying, based on results of the link training procedure, first switch ports of the plurality of switch ports that are routed to unused slots of the plurality of slots via corresponding first bus lanes of the switch fabric bus, and second switch ports of the plurality of switch ports routed to used slots of the plurality of slots via corresponding second bus lanes of the switch fabric bus;
   (c) disabling the first switch ports in response to said identifying the first switch ports; and
   (d) allocating bus numbers to the second switch ports at least in response to said identifying the second switch ports, and not allocating bus numbers to the first switch ports at least in response to said disabling the first switch ports.

2. The method of claim 1, further comprising:
   querying the one or more switches to obtain information indicative of the results of the link training procedure; and
   identifying the first switch ports and the second switch ports based on the obtained information.

3. The method of claim 1, wherein (a) through (d) are performed as part of a bus enumeration procedure for the switch fabric bus system.

4. The method of claim 1, wherein the switch fabric bus includes one or more of:
   a peripheral component interconnect express (PCIe) bus; or
   a PCIe extensions for instrumentation (PXIe) bus.

5. The method of claim 1, wherein the switch fabric bus system includes a chassis, and wherein the plurality of slots are slot of the chassis.

6. The method of claim 1, further comprising:
   performing (a) through (d) each time the switch fabric bus system is reset.

7. The method of claim 1, further comprising:
   performing (b) through (c) via firmware executing in the switch fabric bus system.

8. A system comprising:
   a chassis comprising:
      a switch fabric bus;
      a plurality of slots configured to couple devices to the switch fabric bus;
      one or more switches comprising a plurality of switch ports coupled to the switch fabric bus, wherein the one or more switches are configured to perform a link training procedure to link-train with the plurality of slots; and
      a control unit configured to:
         (a) identify, based on results of the link training procedure, first switch ports of the plurality of switch ports that are routed to unused slots of the plurality of slots via corresponding first bus lanes of the switch fabric bus, and second switch ports of the plurality of switch ports routed to used slots of the plurality of slots via corresponding second bus lanes of the switch fabric bus; and
         (b) disable the first switch ports in response to identifying the first switch ports.

9. The system of claim 8, wherein the control unit is configured to:
   query the one or more switches to obtain information indicative of the results of the link training procedure; and
   identify the first switch ports and the second switch ports, based on the obtained information.

10. The system of claim 8, comprising:
    a host configured to:
       (c) allocate bus numbers to the second switch ports at least in response to identifying the second switch ports and not allocate bus numbers to the first switch ports at least in response to disabling the first switch ports.

11. The system of claim 10, wherein the host is configured to perform (c) as part of a bus enumeration for the switch fabric bus.

12. The system of claim 10, wherein the host is embedded in the chassis.

13. The chassis of claim 8, wherein the switch fabric bus includes one or more of:
    a peripheral component interconnect express (PCIe) bus; or
    a PCIe extensions for instrumentation (PXIe) bus.

14. The chassis of claim 8, wherein the one or more switches are configured to link-train with the corresponding device-coupling ports and the control unit is configured to perform (a) through (b) each time the chassis is reset.

15. A non-transitory memory element storing instructions executable by a processor to:
    (a) identify first switch ports, of a plurality of switch ports, that are routed to unused slots of a plurality of slots via corresponding first bus lanes of a switch fabric bus, and identify second switch ports of the plurality of switch ports routed to used slots of the plurality of slots via corresponding second bus lanes of the switch fabric bus, wherein the plurality of switch ports are included in one or more switches;
    (b) disable the first switch ports in response to identifying the first switch ports;
    (c) do not allocate bus numbers to the first switch ports at least in response to disabling the first switch ports; and
    (d) allocate bus numbers to the second switch ports at least in response to identifying the second switch ports.

16. The non-transitory memory element of claim 15, wherein the instructions are executable to:
    query the one or more switches to obtain information indicative of which switch ports of the plurality of switch ports have successfully link trained with corresponding slots of the plurality of slots; and
    identify the first switch ports and the second switch ports based on the obtained information.

17. The non-transitory memory element of claim 15, wherein the instructions are executable to:
    allocate bus numbers to the second switch ports and not allocate bus numbers to the first switch ports as part of a bus enumeration procedure.

18. The non-transitory memory element of claim 15, wherein the switch fabric bus includes one or more of:
    a peripheral component interconnect express (PCIe) bus; or
    a PCIe extensions for instrumentation (PXIe) bus.

19. The non-transitory memory element of claim 15, wherein the plurality of slots are included in a switch fabric bus chassis.

20. The non-transitory memory element of claim 15, wherein the instructions are executable to:
    perform (a) through (d) each time the chassis is reset.

* * * * *